July 31, 1962 W. M. WILSON 3,047,274
VARIABLE AREA HEAT EXCHANGER
Original Filed Dec. 27, 1956 3 Sheets-Sheet 1

INVENTOR.
WARREN M. WILSON
BY Hudson, Boughton,
Williams, Davis & Hoffmann
ATTORNEYS July 31, 1962 W. M. WILSON 3,047,274
VARIABLE AREA HEAT EXCHANGER
Original Filed Dec. 27, 1956 3 Sheets-Sheet 2

INVENTOR.
WARREN M. WILSON
BY Hudson, Boughton,
Williams, David & Hoffmann
ATTORNEYS

INVENTOR.
WARREN M. WILSON

United States Patent Office 3,047,274
Patented July 31, 1962

3,047,274
VARIABLE AREA HEAT EXCHANGER
Warren M. Wilson, 809 Lake St., Huron, Ohio
Continuation of application Ser. No. 630,927, Dec. 27, 1956. This application Feb. 18, 1959, Ser. No. 794,204
29 Claims. (Cl. 257—313)

This invention relates to heat exchangers of the type wherein a fluid or liquid is utilized to control the temperature of another fluid or liquid.

More particularly the invention relates to a variable area heat exchanger of the type specified.

This application is a continuation of my application Serial No. 630,927, filed December 27, 1956 and now abandoned.

The invention also contemplates a variable area heat exchanger embodying control, preferably automatic control, over both the controlling fluid or liquid and the controlled fluid or liquid.

The heat exchanger contemplated by the present invention is susceptible of various practical uses wherever it is desirable or required to raise or lower the temperature of a fluid or liquid for a predetermined purpose such as controlling the temperature of water, jet fuels or other fluids or liquids and in connection with various control systems for sensing and controlling viscosity of liquids or for sensing and controlling the temperature or flow rate of fluids or liquids.

It will be understood that the invention contemplates a heat exchanger so constructed that the controlling fluid or liquid functions to raise or lower the temperature of the controlled fluid or liquid and that the function of the heat exchanger in raising or lowering the temperature of the controlled fluid or liquid can be regulated by varying the effective thermal transfer area between the controlling fluid or liquid and the controlled fluid or liquid.

Without limiting the use of the heat exchanger embodying the invention and solely for the purpose of illustrating a well understood use for the heat exchanger, the same is described herein in connection with a use wherein the controlled liquid or fluid is water which is heated by the controlling fluid or liquid which is referred to as steam.

In the usual heat exchangers of the type used for heating water the operational efficiency is high and the control thereof can be closely regulated provided the demand on the heated water load output is equal to the maximum capacity of the heat exchanger. However, if the demand of the load output falls below approximately one-half of the rated capacity of the heat exchanger adequate regulation utilizing present day methods of control is very difficult to maintain, since in the known devices the heat exchanging surfaces remain of constant area regardless of the output load requirements. As illustrative of the above noted disadvantages of the present day heat exchanger in which water is to be heated by steam or other heating or controlling medium and the output demand for the heated water is below the ratio stated above, the water will overheat unless the controlling or heating medium entering the exchanger is throttled or controlled to reduce its temperature. However, when the heating medium or steam is throttled, the temperature of the output water is unstable due to the fact that the heat transferring area of the heat exchanger remains substantially constant.

Notwithstanding the specific reference made above relative to the heating of water by the heat exchanger embodying the invention, the broad object of the invention is to provide a heat exchanger susceptible of use for many purposes and wherein the effective thermal transferring area between the controlling fluid or liquid and the controlled fluid or liquid varies in proportion to change in the output conditions of the controlled fluid or liquid, that is in the flow rate, temperature or other output conditions of the controlled fluid or liquid.

A more specific object is to provide a heat exchanger wherein the heat transferring surface area varies in proportion to the output load requirement of the controlled liquid or fluid.

A further object is to provide control means for controlling the heat transfer surface area of a heat exchanger and which means is responsive automatically to the pressures of the incoming and/or outgoing controlling and/or controlled fluids or liquids.

A still further object is to provide in a heat exchanger embodying the present invention a control device that is automatically responsive to regulate the supply of the controlling fluid or liquid.

Another and more specific object is to provide in a heat exchanger novel manifold valve means automatically responsive to the pressures of the incoming and/or outgoing controlling and/or controlled fluids or liquids to shut off the supply to the heat exchanger of the controlling fluid or liquid.

A further and more specific object is the provision of adjustable manifold control valve means whereby the heat exchanger is adaptable for various operating pressures of the controlling fluid or liquid.

Still another object is the provision of a novel heat exchanger that provides automatic control over both the controlling fluid or liquid and the controlled fluid or liquid.

A still further object is to provide a heat exchanger that may be easily adapted for incorporation in various fluid or liquid systems.

A general object is to provide a heat exchanger that is simple in construction and wherein the cost of manufacture and subsequent maintenance is at a minimum.

Additional objects and advantages of the present invention will be readily ascertainable by those versed in the art, and a more comprehensive understanding thereof will be obtained by reference to the following description and accompanying drawings relating to the illustrative adaptations of the heat exchanger for the purpose of heating water by steam, said drawings forming a part of this specification and wherein.

Figures 1, 2:
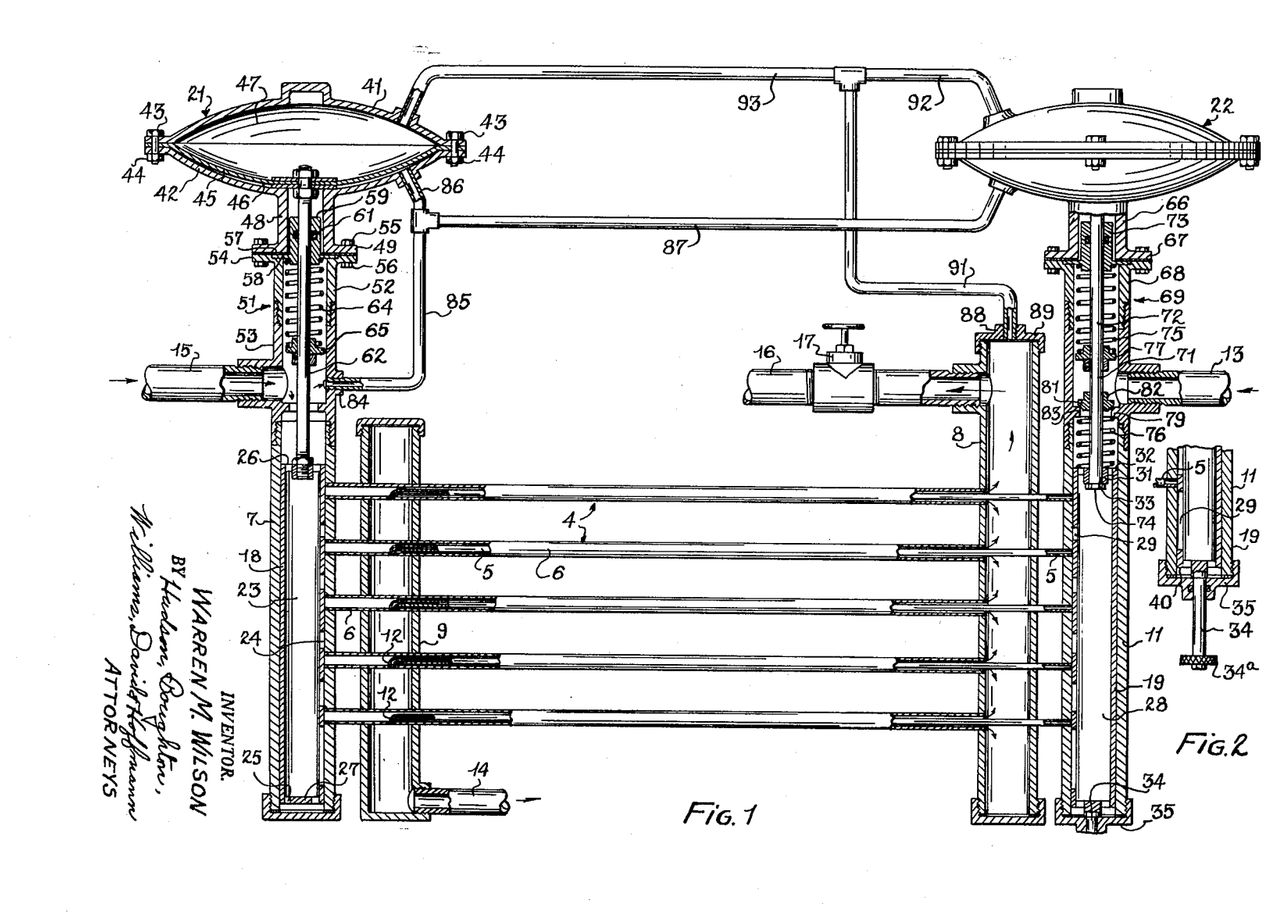
FIG. 1 is an elevational view, shown partly in section, of an embodiment of heat exchanger of the present invention.
FIG. 2 is a vertical sectional view of an adjustment mechanism utilized with the control valve of FIG. 1.

Referring now to the drawings throughout which like elements are designated by like reference characters, the embodiment of heat exchanger of FIG. 1 comprises a plurality of vertical and upstanding manifold members being arranged in substantially vertical coplanar relationship and interconnected by elongated flow tubes 5, disposed within an outer pipe 6 and spaced from the inner walls thereof to permit passage of the fluids or liquids therethrough. Said pipes are sealed one from the other to prevent commingling of their respective fluid or liquid. Either pipe may carry the controlling or controlled fluid or liquid.

In the present disclosure of several embodiments, the inner pipe of the composite flow tube thus formed by each pair of cooperating pipes will be designated to carry the controlling or heating fluid or liquid and the outer pipe will carry the controlled or heated fluid or liquid for purposes of illustration only since it is understood that the heat exchanger can be used for heating or cooling. In other words, the heat exchange between the two fluids or liquids may function to vary the temperature of one fluid or liquid by the effect thereon of the other fluid or liquid. The fluid or liquid the temperature of which will be varied may be designated as the controlled fluid or liquid while the other fluid or liquid may be designated as the controlling fluid or liquid. Each fluid or liquid will be assumed to flow in an opposite direction relative to the other fluid or liquid or in counterflow as is defined in the art. Said fluids or liquids may also flow in the same direction; the distinction being merely a result of the pipe connections made to the heat exchanger.

Many different kinds of controlling or controlled fluids or liquids may be utilized as the functioning media and merely for purposes of illustration steam will hereinafter be referred to as the controlling or heating fluid or liquid and water will be referred to as the controlled or heated fluid or liquid.

Referring now more specifically to the embodiment of FIGS. 1 to 4 inclusive, the outer pipes 6 are extended between and are each secured in an opening in manifold 7, hereinafter defined as the water input manifold, and manifold 8, hereinafter defined as the water output manifold. As is shown in FIG. 1, pipes 6, in extending to manifold 7, pass completely through manifold 9, hereinafter defined as the steam condensate return manifold. Inner pipes 5 are secured to manifold 11, hereinafter defined as the steam input manifold, and suitable fittings 12, attached to the opposite ends thereof and piercing outer pipes 6, provide connection to the steam condensate return manifold 9. Said inner pipes 5, in extending to said manifold 9, pass completely through water output manifold 8.

Input supply pipe 13 and steam condensate return pipe 14 are associated with said steam manifolds 11 and 9, respectively, to provide ingress and egress of the steam supply hereinabove defined as the heating fluid. In like manner, supply pipe 15 and distribution pipe 16 are associated with water manifolds 7 and 8, respectively, to provide ingress and egress of the water supply, hereinabove defined as the fluid to be heated. A control valve 17 may also be interposed within water distribution pipe 16 between water output manifold 8 and the output load (not shown) to provide manual control of the heated water therethrough.

The water input and the steam input to the heat exchanger are regulated by means including control valves 18 and 19 which are substantially similar in configuration and which are reciprocably movable within water input manifold 7 and steam input manifold 11, respectively, by means of interconnected and similarly operative actuator devices 21 and 22.

Figure 3:
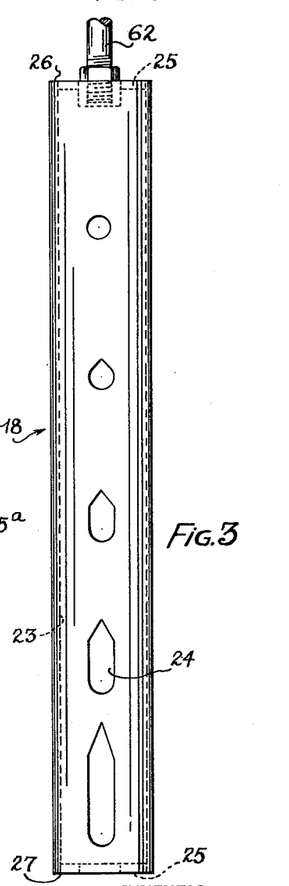
FIG. 3 is a detached elevational view of the reciprocating control valve utilized with the embodiment of FIG. 1.

In view of the valves 18 and 19 being substantially similar, a detailed showing of only valve 18 as detached from within water input manifold 7 in FIG. 3 is given with additional references to any specific dissimilarities in valve 19 being made in the disclosure hereinafter.

Figure 4:
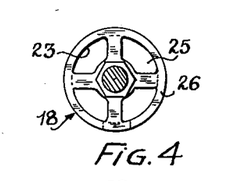
FIG. 4 is a top plan view of the control valve of FIG. 3.

The control valve 18 per se, FIGS. 3 and 4, is substantially elongated, thin-walled and tubular in configuration having an interior cavity 23. A plurality of spaced vertically aligned ports 24 are provided in the wall of said valve and are adapted to selectively connect the outer pipes 6 to water input manifold 7. The shape, size and disposition of each port 24 may be different relative to any other of said ports such as is shown in FIG. 3 wherein the longitudinal length of each port is different relative to any adjacent port. A plurality of angularly spaced openings 25 are formed in the top wall 26 and in the base 27 of said valve 18 to provide passage for the water to the cavity 23 of said valve 18.

Control valve 19, FIGS. 1 and 2, is also provided with an interior cavity 28 and a plurality of vertically spaced ports 29 formed in the wall thereof wherein the longitudinal length of each of said ports is different relative to any adjacent port. A boss 31 formed on the top wall 32 extends downwardly into the cavity 28 and is provided with a central aperture 33, the purpose of which will be explained in detail hereinafter. An adjustment rod 34 may be formed integrally with the base 35 of the valve 19, and which extends downwardly to protrude through and below the base 35 of the manifold 11. A hand gripping portion 34a is provided on the external end of said rod 34 whereupon rotation thereof, the control valve 19 may be rotated within manifold 11 to move its ports 29 to one of a plurality of predetermined positions whereby, only a portion of said ports may register with the connected pipes 5 to control the initial steam input to said manifold. An annular shoulder 40 may be provided on said adjustment rod adapted to slidably engage the base 35 of the manifold 11 and thereby space the control valve 19 thereabove.

The said manifold control valve 18 is reciprocated longitudinally within water input manifold 7 by means of the previously mentioned actuator device 21 which comprises a diaphragm housing formed of shallow, substantially semi-spherical shaped pressure heads 41 and 42 sealed together about their periphery by means of bolts 43 extending therethrough into threaded engagement with nuts 44. A bendable diaphragm 45 is disposed within the housing, extending between the head 41 and 42 and dividing the cavity defined thereby into an input pressure chamber 46 and an output pressure chamber 47. An elongated hollow throat 48 is formed integrally with pressure head member 42, being located substantially axially thereof, and has an annular flange 49 formed on the free end thereof. A shaft housing 51 comprising an upper hollow casing 52 and a substantially T-shaped adapter 53, threadably connected to each other, is attached to actuator device 21 by means of a flange 54 formed on the upper end of casing 52 which is adapted to be secured to the flange 49 of throat 48 by any suitable fasteners such as bolts 55 and retaining nuts 56. The lower end of said adapter 53 is threadably attached to the upper portion of the water input manifold 7. An annular seat 57 formed in the top face of flange 54 is arranged to receive a similarly shaped flange 58 of a shaft bearing 59 disposed within the housing 51, whereby the adjacent faces of flange 49 and seat 57 are adapted to engage said bearing flange 58 to retain said bearing therein. A sealing ring 61 may be carried by the bearing 59 and adapted to slidably engage the surface of a shaft 62 to prevent the water entering into the input pressure chamber 46 of the actuator 21 or escaping therefrom.

The shaft 62, its upper end secured to bendable diaphragm 45, extends downwardly through the shaft housing 51, being slidably supported therein by bearing 59, and into manifold 7 wherein its lower end is attached to the top horizontal wall 26 of control valve 18. A coil spring 64 embracing shaft 62 and interposed between and in pressure engagement with the shaft bearing 59 and an adjustable retainer plate 65, provides a downwardly directed spring pressure or preload upon the shaft 62 and attached control valve 18.

The control valve 19 in steam input manifold 11 is reciprocably operable longitudinally therein by means of actuator device 22 whose internal configuration and function is similar to actuator device 21 and, therefore, an additional description of its structure will not be enumerated.

The actuator device 22 is also provided with a throat 66 having a flange 67 on its lower end to which is attached an upper casing 68 of a shaft housing 69. A T-shaped adapter 71 its one end being threadably attached to manifold 11 is connected to the opposite end of said casing.

A shaft 72, its upper end (not shown) being attached to the bendable diaphragm of actuator device 22, extends downward through the shaft housing 69, and is slidably supported therein by a bearing 73 which is similar to bearing 59. The opposite end of said shaft 72 protrudes through the aperture 33 in boss 31 of control valve 19, and is slidably secured therein by means of an annular flange 74 mounted on the extremity of said shaft arranged to engage the underside surface of said boss.

An initial or preload spring pressure is applied to the control valve 19 by a pair of spring members 75 and 76 to prevent said valve from floating upwardly within the manifold 11, and also to actuate valve means presently to be described to control the inflow of the steam. Spring 75 is disposed within shaft housing 69 and surrounds shaft 72, being interposed between bearing 73 and a retainer plate 88 adjustably secured to said shaft. Spring 76 is disposed within manifold 11, surrounding the shaft 72, and is interposed between the horizontal top wall 32 of the control valve 19 and an annular shoulder 79 formed on the lower portion of the T-shaped adapter 71 of the shaft housing 69.

Spring 76 is operative to force the control valve 19 against the annular flange 74 of shaft 72 to prevent said control valve 19 from floating upwardly within the manifold 11, and also functions to assist spring 75 in retaining the valve in its initial adjusted position subsequent to placement thereof by the adjustment rod 34.

A steam shut-off valve 81 is adjustably secured to the valve shaft 72 by means of setscrew 82, and is arranged to be seated upon valve seat 83 formed on the edges of annular shoulder 79 to shut off the steam input supply to manifold 11 whenever the output load has been satisfied and the heat exchanger is returned to its inoperative position.

The reactions of springs 75 and 76 may be additive in that their combined initial or preload pressure is substantially equal to the pressure exerted by the spring 64, operative upon control valve 18 within water input manifold 7. In the present instance, merely for purposes of illustration and simplicity of explanation, the combined reactions of the above defined springs 75 and 76 on said control valve 19 are assumed to be equal in magnitude to the reaction of spring 64 on said control valve 18. However, it is contemplated that any desired combination may be utilized to produce an unequal spring pressure on each control valve depending upon the particular practical adaptation thereof.

As is shown in FIG. 1, the actuator devices 21 and 22 may be connected in a parallel relationship whereby samples of water selected at any predetermined point in the heat exchanger may be simultaneously introduced to each of said devices to produce the same reaction upon both control valves 18 and 19.

More specifically, a port 84 may be provided in shaft housing 51 to enable a sample of the water in the water input manifold 7 to be transmitted by means of the parallel combination of pipes 85, 86 and 87 to the lower pressure chamber in each of said diaphragm housings. In like manner, a port 88 may be provided in the top wall 89 of water output manifold 8 to enable a sample of the water in said manifold to be transmitted by means of the parallel combination of pipes 91, 92 and 93 to the upper pressure chamber in each of said diaphragm housings.

It is also understood that by predetermined selection of the points of sampling for the water to be introduced to the actuator devices, each actuator device may be separately excited; the embodiment disclosed in FIGS. 1 to 4 merely illustrating one arrangement, other embodiments being thereafter readily ascertainable.

Figure 5:
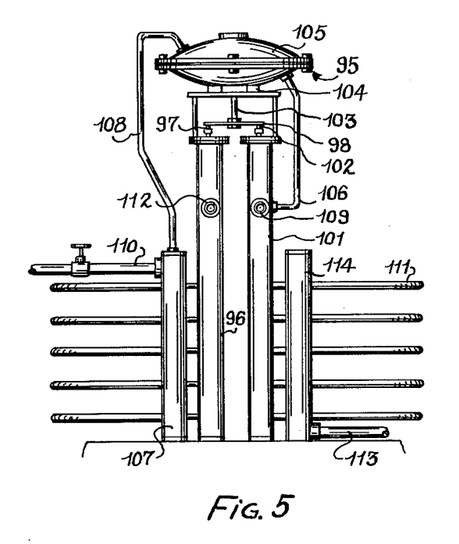
FIG. 5 is a second embodiment of a heat exchanger of the present invention.

In the form of heat exchanger illustrated in FIG. 5 one actuator device 95 is operative to provide vertical reciprocal movement for control valves movably disposed in manifolds arranged in vertical juxtaposition relative to each other.

More specifically, the control members though not shown, may be similar to the type illustrated in FIGS. 1 to 4, being reciprocated longitudinally within their respective manifolds.

The control valve disposed in steam input manifold 96 is provided with a shaft 97 which extends upwardly therefrom and is secured to one end of bridge or yoke member 98. The control valve disposed in a water input manifold 101 is also provided with a shaft 102 which extends upwardly therefrom and is similarly attached to an opposite end of yoke member 98. At the midpoint of said yoke member 98 means are provided to attach one end of a shaft 103 thereto; said shaft extending upwardly through a stuffing box 104 and into a diaphragm housing 105 of actuator device 95, being connected to the bendable diaphragm (not shown) disposed therein in a manner similar to that disclosed hereinabove.

A sample of the water in water input manifold 101 is transmitted to the lower pressure chamber of the diaphragm housing 105 by means of an interconnected pipe 106, and a sample of the water in a water output manifold 107 is transmitted to the upper pressure chamber of said housing 105 by means of an interconnected pipe 108.

The composite flow tubes 111 in the present instance are of the aforesaid pipe within a pipe construction and may be of any desired configuration, and may also be connected to the manifolds in any selected space relationship. Although not shown in full detail, said flow tubes are preferably circular in configuration, wherein said manifolds are arcuately spaced along the longitudinal axis of said tubes. Suitable pipes 109 and 110 are provided for the ingress and egress of the water to water input manifold 101 and from water output manifold 107. Pipes 112 and 113 are also provided for the ingress and egress of steam to steam input manifold 96 and from steam condensate manifold 114.

The form of heat exchanger shown in FIGS. 6 to 10 inclusive includes a plurality of coil-type composite flow tubes 114a, each comprising an inner pipe 115 disposed within an outer pipe 116 and spaced from the inner walls thereof to permit passing of the controlling or controlled fluids or liquids therethrough. Said pipes are sealed one from the other to prevent commingling of their respective fluid or liquid. Each of said coil-type tubes is formed having a different diameter and number of convolutions resulting thereby in a different heat transferring area therefor. The heat exchanger also includes a plurality of hollow cylindrical manifold members to which said flow tubes are connected, and in several of which are provided rotatably movable control means to regulate the entrance of the heating fluid or liquid to the exchanger and also the flow of heated fluid or liquid from said exchanger; both of said regulating functions being the result of a demand for heated water by the demand source (not shown). As referred to hereinabove, steam will be referred to as the heating fluid and water will be referred to as the fluid to be heated.

Figure 6:
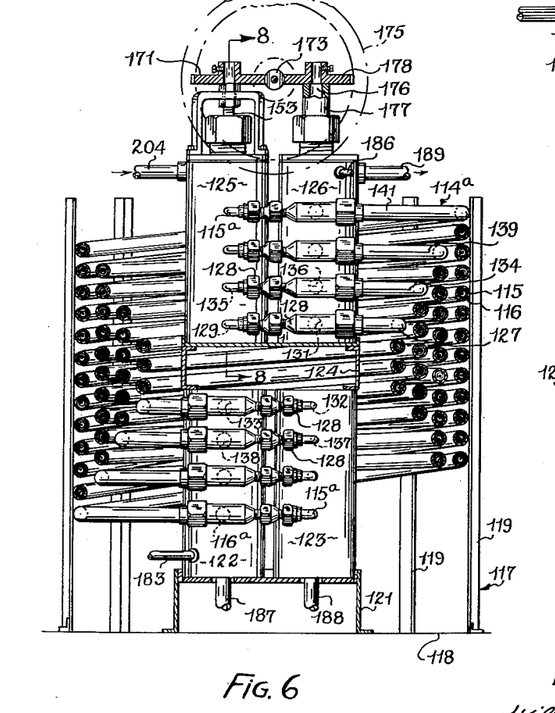
FIG. 6 is a fragmentary elevational view, shown partly in section, of a third embodiment of heat exchanger of the present invention.

More specifically, the heat exchanger of the present form is supported in a suitable frame 117 comprising a flat base 118 and a plurality of vertically upstanding stanchions 119. An upright casing 121 fastened to the base 118 provides support for a pair of manifold members, namely, a water inlet manifold 122 and a steam condensate return manifold 123. In similar fashion, a channel support 124 mounted on the top wall of said manifolds 122 and 123 provides support for a second pair of manifold members, namely, a steam inlet manifold 125 and a water output manifold 126.

The coil-type flow tube 127, which has the smallest diameter and number of convolutions, is placed around the channel support 124, being spaced horizontally therefrom, and on its one end is provided with a substantially T-shaped fitting 128, later to be described, which enables the said one end of the inner pipe 115 thereof to be connected to a bottom port 129 provided therefor in the steam input manifold 125 and the said one end of outer pipe 116 to be connected to a bottom port 131 in the water output manifold 126. The opposite end of flow tube 127 is also provided with one of said fittings 128 which enables said opposite end of the inner pipe 115 to be connected to a top port 132 in the steam condensate return manifold 123 and the said opposite end of outer pipe 116 to be connected to a top port 133 in the water input manifold 122.

In like manner, a coil-type flow tube 134, which has the next largest diameter and number of convolutions, is placed around the flow tube 127 in such manner as to extend above and below the convolutions of the latter. The ends of said flow tube 134 are each provided with one of said fittings 128 whereby the inner pipe 115 at its upper end is connected to a port 135 next above the previously mentioned port 129 in the steam input manifold 125, and the outer pipe 116 has its upper end connected to a port 136 next above the previously mentioned port 131 in the water output manifold 126, while the opposite end of the inner pipe is connected to a port 137 next below the previously mentioned port 132 in the steam condensate return manifold 123 and the opposite end of the outer pipe is connected to a port 138 next below the port 133 in the water input manifold 122. Two remaining flow tubes 139 and 141 having respectively successively greater diameters and number of convolutions are placed around the aforementioned flow tubes 127 and 134 in a similar fashion and are each provided on its ends with one of said fittings 128 to enable connection of said inner and outer pipes thereof to the manifolds in the same manner as described above. With regard to FIGS. 6 and 7, said flow tubes, as described above, are positioned relative to each other so as to provide helically wound tubes extending beyond the innermost flow tube 127 both in an upward and downward direction.

Figure 10:
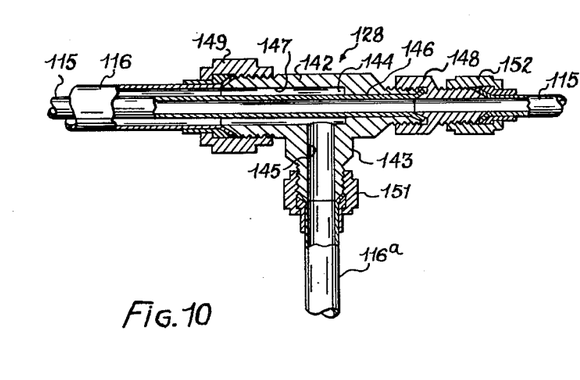
FIG. 10 is a fragmentary elevational view, shown partly in section, of a fitting utilized in the embodiment of FIG. 6.

With reference to the fitting 128, any configuration thereof may be utilized to connect said flow tubes as described above to their respective manifolds. In the present form of heat exchanger, the fitting utilized is produced commercially by The Parker Appliance Company of Cleveland, Ohio, and described in their catalog No. 4300 as a "Triple-Lok Type." Said fitting is shown in FIG. 10 of the present drawings and comprises an elongated body 142 having an integrally formed neck 143 intermediate the ends thereof and extending substantially at a right angle thereto. A channel 144 is formed in said body 142 extending partially therethrough and connects with a similarly formed channel 145 extending completely through the neck 143. A channel 146 of somewhat smaller diameter is formed in the remaining portion of the body 142, extending therethrough and connecting to said channel 144. The inner pipe 115 of each flow tube extends completely through channel 144 being spaced from wall 147 thereof to provide a passageway for the water therebetween and protrudes into and through channel 146 whereby the end of said pipe is secured to the body 142 by means of a connector 148 threaded onto the end of said body. The end of outer pipe 116 of each flow tube is fastened to the opposite end of the body 142 by means of threaded connector 149 and connects with the channels 144 and 145.

A cap member 151 adapted to be in threaded engagement with the neck 143 enables attachment of a short length of pipe 116a whereby the heated media or water in outer pipe 116 is connected to its respective manifolds.

Similarly, a cap member 152 adapted to be threadably attached to the connector 148 carries a short length of pipe 115a which enables the heating media or steam in inner pipe 115 to be connected to its respective manifolds.

As previously mentioned, the steam input and heated water output of the heat exchanger are regulated by control means rotatably disposed in several of the manifold members and are responsive to the variable water output requirements.

Figure 8:
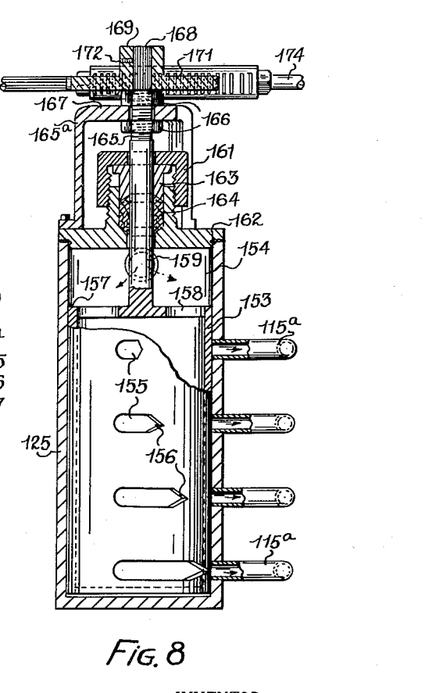
FIG. 8 is a vertical sectional view taken on line 8—8 of FIG. 6 and looking in the direction of the arrows.

More specifically, the steam input manifold 125, FIG. 8, is provided with a thin-walled tubular control valve 153 which is rotatably mounted in a cavity 154 of said manifold, being driven by means to be later described, and has a plurality of vertically spaced ports 155 formed in said wall thereof. Each of said ports is adapted to register with one of the short lengths of pipe 115a attached to said manifold and adapted to connect its associated inner pipe 115 carrying the heating fluid or steam. The control valve 153 is also adapted to be movable longitudinally in said manifold by means later to be described, whereby said ports 155 may be moved to any degree of register with said pipe 115a, the purpose for which will be apparent hereinafter. The size, shape and disposition of each of said ports 155 may be different relative to each other as is shown in FIG. 8 wherein the length thereof varies horizontally. This particular configuration enables the control valve to connect one, several or all of the connected coil-type pipes 115 to the manifold. It is also realized that by predetermined disposition of said ports, any selected combination of said pipes may be connected to the manifold. The leading edges of each of said ports 155 may also converge to form an apex 156 whereby a further minute regulation of the fluid passing therethrough may be realized. The control valve 153 may also be rotatable to a position in said manifold wherein none of the ports 155 are in registry with said connected pipes. As shown in FIG. 8, this position will be realized when no further requirement for heater water is needed by the demand source. A top wall 157 of said control valve is also provided with a plurality of spaced openings 158 which permit substantially an unrestricted flow of steam from the manifold cavity 154 into said valve.

The water output manifold 126 is also provided with a rotatable control valve (not shown) which is similar in configuration and disposed in said manifold in the same manner as is control valve 153 in its manifold 125, and therefore an additional definition thereof will not be given.

A drive mechanism for delivering motive power to said valve members to rotate the same is provided and includes a drive shaft 159, formed integrally with the top wall 157 of the control valve 153, and which extends axially upwardly therefrom and slidably protrudes through a bearing cap 161 mounted on a head 162 of the steam inlet manifold 125, which, in turn, carries a suitable bearing 162 and a packing gland 164. Said shaft is formed with a reduced end portion which is threaded at 165, which portion extends through a vertically upstanding bridge member 165a. A pair of suitable locking nuts 166 may be threaded upon said portion 165, one of said pair being placed on either side of a top plate 167 of said bridge member 165a. As seen in FIG. 8, upon threading the bottom nut of said pair of nuts downward upon the shaft and then threading the top nut thereof also downward, the control valve 153 will be raised within the manifold 125. Likewise, when the reverse to that above described is performed, the control valve will be lowered into said manifold. Said upward or downward adjustment of said control valve moves the ports 155 thereof into partial horizontal misalignment relative to the connected pipes 115a for a purpose to be explained later.

Figure 7:
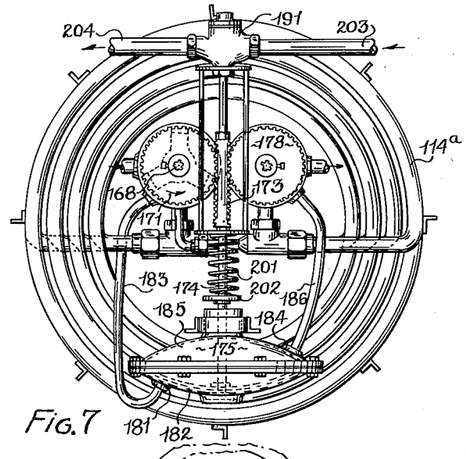
FIG. 7 is a top plan view of the embodiment of a heat exchanger of FIG. 6.

An outer extremity 168 of the drive shaft 159 is splined longitudinally thereof and is slidably supported within a splined hub 169 of a drive pinion 171, FIGS. 7 and 8. A setscrew 172 in threaded engagement with the hub 169 is arranged to lock said shaft to the pinion upon completion of the aforesaid adjustment by lock nuts 166. The drive pinion 171 is arranged to mesh with one side of an elongated double-faced rack 173 carried by a movable shaft 174 of an actuator device 175 to be presently described.

The drive mechanism also includes a drive shaft 176, FIG. 6, mounted on the control valve (not shown) in the water output manifold 126 being rotatably supported therein by suitable bearing structure 177 and which has its end attached to a drive pinion 178. Said drive pinion is arranged to mesh with the opposite side of the elongated rack 173.

The rack 173 is reciprocably driven whereby the control valves are rotatable within their respective manifolds to regulate the flow of the inlet steam and the heated water output, and this is accomplished by means of the actuator device 175 supported in the frame 117 above said manifolds, and which has one end of its reciprocably movable shaft 174 attached to a flexible diaphragm 180 and its opposite end connected to the adjacent end of the rack 173.

The internal construction and function of said actuator device is similar to that of the previously described actuator device 21 in the FIGS. 1 to 4 embodiment of the present invention and therefore it will not be further described in detail. However, it may be said that although only one actuator device is shown in the instant form provision may be made within the concepts of the present invention for two separate actuator devices whereby each control valve may be separately regulated.

A suitable port 181 is provided in a pressure head member 182 of the actuator device 175 to which one end of a tubing 183 is attached. The opposite end of said tubing is connected to the lower end of the water inlet manifold 122 whereby a sample of the fluid pressure therein may be transmitted to said actuator device. In like manner, a port 184 is provided in a pressure head member 185 of said actuator device to which one end of tubing 186 is attached. The opposite end of said tubing is connected to the upper end of the water outlet manifold 126 whereby a sample of the fluid pressure therein may be transmitted to said actuator device.

Suitable means are provided in the various manifolds of the heat exchanger to connect the latter to the supply of steam and water and also to provide a return for the steam condensate and a connection to the demand load. More specifically, a conduit 187 is connected to the base of water inlet manifold 122 to provide a supply of water to said exchanger and a conduit 188 is provided in the base of steam condensate manifold 123 to enable said condensate to return to the supply source for the steam. In like manner, a conduit 189 is connected to the upper end of the water outlet manifold 126 and provides for the transmission of the heated water to the demand load.

Figure 9:
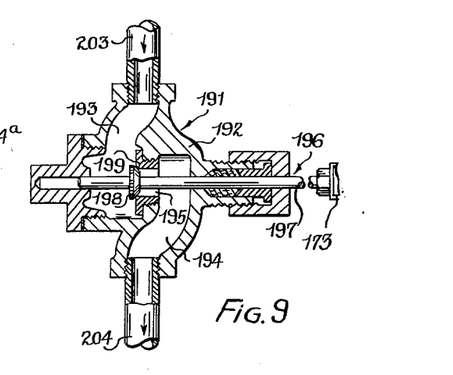
FIG. 9 is a detached sectional view of the heating fluid shutoff valve utilized with the embodiment of FIG. 6.

The steam supply to the heat exchanger is controlled by a steam shut-off valve 191 supported in the frame 117 and which is connected into the steam supply system and actuated by the movable rack 173. With reference to FIG. 9, steam shut-off valve 191 comprises a body 192 having a pair of chambers 193 and 194 provided therein which are interconnected through means of a valve port 195. A valve 196 is slidably supported in said body and one end of a stem 197 thereof extends exteriorly of said body and is attached to the adjacent end of the rack. An enlarged valve head 198 mounted on said stem is arranged to be disposed upon a valve seat 199 provided in said port 195 and a spring 201, FIG. 7, surrounding the actuator shaft 174 and interposed between an adjustable pressure plate 202 carried by said shaft and a portion of the frame 117, is normally operative to retain said valve head upon the valve seat 199 to close said port. A conduit 203 attached to the valve body 192 connects with the valve chamber 193 and its opposite end (not shown) is connected to the steam supply. Conduit 204 attached to the opposite end of said body and connected to valve chamber 194 has its opposite end attached to the upper end of the steam inlet manifold 125 as shown in FIG. 6. It will, therefore, be realized in the present form of heat exchanger that the steam inlet supply will be disconnected from said manifold 125 whenever the actuator device 175 is operable to return the heat exchanger to its inactive or rest position to close valve 191, this being realized whenever the demand load no longer requires a supply of heated water.

It will also be realized that when the requirement for the demand load is small, the coil-type flow tube 127 having the least heat transferring surface area will be the first one that is activated. And, as said requirement increases, the remaining flow tubes 134, 139 and 141 which have successively increasing heat transferring areas, may be activated to satisfy said requirement.

It will be further realized that the heat emanating from a flow tube located inwardly toward the manifold is utilized to assist in heating the flow tube located outwardly thereof. For instance, the heat of flow tube 127 is utilized to heat the flow tube 134.

It is also realized that the placement of the manifolds in the present form of heat exchanger and the place of entry and exit for each of the fluids in said manifolds takes advantage of the natural physical laws of gravity to assist in the operation thereof.

The operation of the above disclosed forms of the heat exchanger will now be described.

In operation, the embodiment disclosed in FIGS. 1 to 4, wherein the manifold control valves are each directly operative by one of parallel connected actuator members, the heat exchanger is shown in its rest or off position, which condition exists whenever no demand for water by the demand load is realized. During this period the pressures within water input manifold 7 and water output manifold 8 are substantially equal, and no reaction is experienced thereby within the parallel connected pressure chambers of the actuator devices 21 and 23 connected in fluid circuit therewith. Rod 34 may be manipulated to rotate control valve 19 whereby its ports will be adjusted angularly relative to the pipes 5 connected to manifold 11 to establish the desired steam input to said pipes, and to adjust the heat exchanger to the steam input pressure. However, the combined reaction of springs 75 and 76, as hereinabove stated, are operable to retain control valve 19 in a position wherein none of its ports are in registry with said pipes 5, and also to force steam shutoff valve 81 upon its valve seat 83. Additionally, spring 64 embracing shaft 62 is operative to retain control valve 18 in a position wherein none of its ports are in registry with the connected pipes 6.

When the demand load initiates a demand for water a drop in pressure in water distribution pipe 16 and connected water outlet manifold 8 is experienced. Said pressure change is transmitted through pipes 91, 92 and 93 to the upper chambers 47 of actuator devices 21 and 22.

When the differential in pressure between the upper pressure chamber 47 and lower pressure chamber 46 of each actuator member reaches a predetermined value, depending upon the amount of spring bias exerted by spring 64 on shaft 62 and springs 75 and 76 on shaft 72, the diaphragm 45 of each actuator is forced upward. The control valves 18 and 19 being connected to said diaphragms 45 by means of shafts 62 and 72 are slidable thereby upwardly within their respective manifolds 7 and 11, whereby a predetermined number of the ports of said control valves are brought into registry with pipes 6 and 5.

As is shown in FIG. 1, the bottommost port of each control valve has the greatest longitudinal length relative to any other port and is positioned to be brought into registry with its associated pipe prior to any other port being actuated. The upward movement of shaft 72 also carries steam shutoff valve 81 upward to connect steam inlet manifold 11 to the shaft housing 69 and steam input pipe 13. The steam enters into shaft housing 69 through pipe 13, and into control valve 19 and then through its actuated ports and into connected pipes 5. The steam passing therethrough transfers heat to the surfaces of said pipes and the resulting condensate is then emitted into steam condensate return manifold 9 and thence returned to the steam supply source by means of pipe 14.

The water enters into water inlet manifold 7, passing into the control valve 18, through its actuated ports and into connected pipes 6. The water upon passing through said pipes passes over the surfaces of pipes 5 whereby said water is heated and then transmitted to the water outlet manifold 8 and through distribution pipe 16 to the demand load for its ultimate utilization.

Upon a change in demand for water from the demand load a proportional change in pressure will be experienced in distribution pipe 16 and water outlet manifold 8. This change in pressure is transmitted to the upper pressure chambers 47 of actuator devices 21 and 22 resulting in a new pressure differential within said devices whereby the control valves 18 and 19 are slidable to a new position within manifolds 7 and 11 to connect and/or disconnect the pipes 6 and 5 to accommodate said change.

When the demand is satisfied, water may be cut off at the output load by any suitable means (not shown) whereby the pressure builds up within the upper pressure chambers 47 of said actuator devices whereby the diaphragms are moved to force the control valves 18 and 19 downward within their respective manifolds to move their ports out of registry with the pipes 6 and 5. When the pressures within the chambers 46 and 47 of actuator devices 21 and 22 are substantially equal, the control valves 18 and 19 are positioned such that the ports thereof are completely out of registry with said pipes 6 and 5. Steam shut-off valve 81 attached to shaft 72 is actuated to cut off the steam to manifold 11, and the heat exchanger is once again returned to its rest or off position awaiting a subsequent demand from the demand load.

From the operational cycle just described it is realized that said heat exchanger is initiated by a change in water pressure which is inversely proportional to the flow thereof and that by measuring the pressure differential between the water flowing into and out of the heat exchanger, a highly accurate degree of control is acquired.

In addition, by regulating the quantity of water and steam input to the heat exchanger in response to the actual load requirement, only that portion of the heat exchanging surface area that is required to heat the water is utilized, thereby resulting in a more efficient and regulatory device than heretofore realized.

It is also to be understood that any other variable criteria existing within the heat exchanger, such as a temperature differential between the water in the inlet and outlet manifolds may be utilized to vary the heat transferring area thereof without departing from the inventive concepts of the present invention.

In the embodiment of FIG. 5, when the output load initiates a demand for water, a drop in pressure in water output manifold 107 is experienced and transmitted to the upper pressure chamber of actuator device 105 by means of pipe 108. When the pressure differential between the upper and lower pressure chambers of said actuator device reaches a predetermined value, the shaft 103 is forced upward and the yoke member 98 attached between the lower end thereof and shafts 97 and 102 of the control valves within manifolds 96 and 101 carries said control valves upward to actuate the required number of flow tubes 111. By constant interpretation of the pressure differential existing between the water input and water output of the heat exchanger, the actuator device 85 functions to actuate only that number of flow tubes 111 required of the output load whereby maximum efficiency and regulation are maintained.

In the preferred form of the present invention in FIGS. 6 to 10 inclusive, the heat exchanger is shown in its inoperative or rest position wherein the control valves within the steam inlet manifold 125 and the water output manifold 126 are positioned so that their respective ports are out of registry with the composite flow tubes 114a.

When a demand for heated water is required by the demand load, a drop in pressure will result in the water outlet pipe 189 and connected water output manifold 126. Such drop in pressure is also transmitted to one of the pressure chambers of the actuator device 175 through the connected tube 186 to cause a differential in fluid pressure to exist between the said pressure chambers. When said differential is of sufficient magnitude to overcome the bias of the spring 201, the diaphragm of said actuator device 175 is forced upward, as viewed in FIG. 7, whereby the rack 173 causes the drive pinions to be rotated in the direction of the arrows 190 to rotate the control valves in the stem inlet manifold 125 and water outlet manifold 126. The movement of the rack 173 also causes the steam shutoff valve 191 to be opened whereby the stem flows through the stem supply pipe 204 and into the steam inlet manifold 125. A number of ports of said control valves are thereby brought into registry with the connected flow tubes 114a; the number thereof depending upon the requirement for heated water by the demand load. The steam is thereby allowed to enter into said manifold 125 and to flow through the inner pipes 115 of the activated flow tubes whereby the water entering the water inlet manifold 122 and flowing through the outer pipes 116 of said activated flow tubes is heated. Said heated water then flows through the water outlet manifold and connected water distribution pipe 189 to the demand load. The steam in giving up its heat to the water, condenses and is collected in steam condensate manifold 123 whereby it is returned to the steam source through connected pipe 188.

It will now be realized that if the demand for heated water is small, the flow tube 127 which has the smallest diameter and number of convolutions will be the first tube that is actuated. If the actuation of said flow tube is not sufficient to satisfy the requirement for heated water, then the flow tube 134 which has the next largest diameter and number of convolutions will be additionally actuated. In like manner, the remaining flow tubes 139 and 141 may be successively actuated in response to the requirement of the demand load.

It will also be realized that the placement and connection of the individual flow tubes with respect to the manifolds may be different than is shown to accommodate for a particular installation encountered in the field.

When the requirement for heated water has been satisfied said water is cut off at the demand load by any suitable means, whereby the fluid pressure in each of said pressure chambers in the actuator device 175 is again equalized. The rack 173 is reciprocated in the opposite direction to that described above whereby the control valves in said manifolds are moved to a position whereby the ports thereof are out of registry with the previously actuated flow tubes. The movement of the rack 173 also causes the steam shutoff valve 191 to close whereby the supply of steam to the heat exchanger is disconnected therefrom.

Having thus described several embodiments it is realized that the present invention is susceptible of various modifications and combinations that are within the scope and spirit of the appended claims.

Having thus described my invention, I claim:

1. A variable area heat exchanger comprising a first manifold means interconnected by a plurality of pipe means arranged to transmit therethrough fluid or liquid the temperature of which is to be controlled, second manifold means interconnected by a plurality of pipe means and arranged to transmit therethrough a heat controlling fluid or liquid, the individual pipes of one of said plurality of pipe means being disposed within and extending in spaced relationship through corresponding individual pipes of the other of said plurality of pipe means, fluid or liquid control means comprising valves movably disposed within both of said manifold means and having a plurality of spaced ports arranged to sequentially and selectively connect said manifold means to said individual pipes, an actuator means for said valves responsive to the flow of the fluid or liquid the temperature of which is to be controlled for moving said valves in phase and placing one or more of said ports into selective registry with said individual pipes.

2. A variable area heat exchanger comprising manifold means interconnected by a plurality of pipe means arranged to transmit therethrough a fluid or liquid the temperature of which is to be controlled, manifold means interconnected by a plurality of pipe means arranged to transmit therethrough a temperature controlling fluid or liquid, the individual pipes of one of said plurality of pipe means being disposed within and extending in spaced relationship through corresponding individual pipes of the other of said pipe means, fluid or liquid control means comprising valves movably disposed within both said manifold means and having a plurality of spaced ports arranged to connect said manifold means selectively to one or more of said individual pipes, actuator means for said valves comprising means connected to the manifold means for the fluid or liquid the temperature of which is to be controlled and responsive to a change in the flow of such fluid or liquid, shaft means interconnected between said valves and said flow responsive means and operable by said flow responsive means to move said valves in phase and place said ports into selective registry with said individual pipes.

3. A variable area heat exchanger comprising first tubular manifold means interconnected by a plurality of pipe means spaced from each other and spaced longitudinally of said manifold means and extending transversely of the latter and arranged to transmit therethrough a fluid or liquid the temperature of which is to be controlled, second tubular manifold means interconnected by a plurality of pipe means spaced from each other and spaced longitudinally of said second manifold means and extending transversely of the latter and arranged to transmit therethrough a temperature controlling fluid or liquid, the individual pipes of one of said plurality of pipe means being disposed within and extending in spaced relationship through corresponding individual pipes of the other of said plurality of pipe means, fluid or liquid control means comprising substantially tubular valves extending longitudinally of and rotatably disposed within both of said manifold means and having a plurality of different length ports formed therein in spaced relationship longitudinally of said valves and extending circumferentially transversely thereof and arranged to connect said manifold means to said individual pipes, actuator means for said valves comprising means connected to the manifold means for the fluid or liquid the temperature of which is to be controlled and responsive to a change in the fluid or liquid transmitted therein, reciprocable shaft means operatively connected to and movable by said fluid or liquid responsive means, means attached to said valves in engagement with said shaft means and operable to transform the movement of said shaft means into rotatable movement to rotate said valves in phase and carry one or more of said ports into selective registry with one or more of said individual pipes.

4. A variable area heat exchanger as defined in claim 3 and wherein said first and second manifold means and said valves therein are arranged vertically while said plurality of pipe means interconnecting said first and second manifold means extend horizontally.

5. A variable area heat exchanger comprising first tubular manifold means interconnected by a plurality of pipe means spaced from each other and spaced longitudinally of said manifold means and extending transversely of the latter and arranged to transmit therethrough a fluid or liquid the temperature of which is to be controlled, second tubular manifold means interconnected by a plurality of pipe means spaced from each other and spaced longitudinally of said second manifold means and extending transversely of the latter and arranged to transmit therethrough a temperature controlling fluid or liquid, the individual pipes of one of said plurality of pipe means being disposed within and extending in spaced relationship through corresponding individual pipes of the other of said plurality of pipe means, control means for the fluids or liquids comprising substantially tubular valve means extending longitudinally of and reciprocably movable within both said manifold means and having a plurality of different length ports formed therein in spaced relationship longitudinally of said valves and extending longitudinally of said valves and arranged to connect said manifold means to said individual pipes, actuator means for the valve means comprising means connected to the manifold means for the fluid or liquid the temperature of which is to be controlled and responsive to a change in the fluid or liquid transmitted therein, shaft means interconnected between said valve means and said fluid or liquid responsive means and reciprocably movable by said fluid responsive means to move said valve means in phase and carry one or more of said ports into selective registry with one or more of said individual pipes.

6. A variable area heat exchanger as defined in claim 5 wherein said first and second manifold means and said valve means therein extend vertically while both of said plurality of pipe means extend horizontally with the individual pipes thereof spaced apart vertically.

7. A variable area heat exchanger comprising a first tubular inlet manifold and a first tubular outlet manifold interconnected by a set of pipes spaced from each other and spaced longitudinally of said first inlet and outlet manifolds and extending transversely of the latter and arranged to transmit therethrough a fluid or liquid the temperature of which is to be controlled, a second tubular inlet manifold and a second tubular outlet manifold interconnected by a set of pipes spaced from each other and spaced longitudinally of said second inlet and outlet manifolds and extending transversely of the latter and arranged to transmit therethrough a temperature controlling fluid or liquid, the pipes of one set being disposed within and extending through the pipes of the other set in spaced relationship thereto, a first tubular valve means extending longitudinally of and rotatably movable within the first outlet manifold and having a plurality of different length ports formed therein in spaced relationship longitudinally of said first valve means and extending circumferentially thereof, a second tubular valve means extending longitudinally of and rotatably disposed within the second inlet manifold and having a plurality of different length ports formed therein in spaced relationship longitudinally of said second valve means and extending circumferentially thereof, actuating means for both of said valve means comprising means connected to the first inlet and the first outlet manifolds and responsive to the flow therein of the fluid or liquid, means connected between said fluid responsive means and both of said valve means arranged to be movable by said fluid responsive means to rotate in phase both of said valve means and bring said first outlet manifold and said second inlet manifold into selective registration with one or more of said connected pipes through one or more of said ports.

8. A variable area heat exchanger as defined in claim 7 wherein all of said manifolds and valve means extend vertically and all of said pipes extend horizontally.

9. A variable area heat exchanger as defined in claim 7 wherein adjustment means are operatively connected to the second valve means in the second inlet manifold and arranged to reciprocably move said second valve means longitudinally of said second inlet manifold into a plurality of predetermined rotatable positions wherein the ports of said second valve means are positioned to be capable of partial registry only with said interconnected pipes.

10. A variable area heat exchanger as defined in claim 7 wherein the means connected between the fluid or liquid responsive means and both of said valve means comprises a rack having one end connected to said actuating means and reciprocably movable thereby, pinion means secured to both of said valve means and in meshing engagement with said rack and arranged to be simultaneously rotatably movable thereby to rotate both of said valve means simultaneously and in phase.

11. A variable area heat exchanger comprising a first tubular inlet manifold and a first tubular outlet manifold interconnected by a set of pipes spaced from each other and spaced longitudinally of said manifolds and extending transversely of the latter and arranged to transmit therethrough a fluid or liquid the temperature of which is to be controlled, a second tubular inlet manifold and a second tubular outlet manifold interconnected by a set of pipes spaced from each other and spaced longitudinally of said second inlet and outlet manifolds and extending transversely of the latter and arranged to transmit therethrough a temperature controlling fluid or liquid, the pipes of one of said sets being disposed within and extending through the corresponding pipes of the other of said sets in spaced relationship thereto, first tubular valve means extending longitudinally of and reciprocably movable within the first inlet manifold and having a plurality of different length ports formed therein in spaced relationship longitudinally of said first valve means and extending longitudinally thereof, second tubular valve means extending longitudinally of and reciprocably movable within the second inlet manifold and having a plurality of different length ports formed therein in spaced relationship longitudinally of said second valve means and extending longitudinally thereof, actuating means for both of said valve means comprising means connected to the first inlet and the first outlet manifolds and responsive to the flow of the fluid or liquid therein, means connected between said fluid responsive means and both of said valve means arranged to be movable by said fluid responsive means to reciprocate in phase both of said valve means and bring said first and second inlet manifolds into selective registration with the respectively connected pipes through one or more of said ports in both of said valve means.

12. A variable area heat exchanger as defined in claim 11 wherein all of said manifolds and said valve means are vertically disposed while said pipes of both sets of pipes are horizontally disposed.

13. A variable area heat exchanger as defined in claim 11 wherein adjustment means is connected to the second valve means in the second inlet manifold and is arranged to rotate said second valve means into a plurality of predetermined reciprocable positions wherein the ports in said second valve means are capable of being positioned only in partial registration with the pipes interconnected to said second inlet manifold.

14. A variable area heat exchanger as defined in claim 11 wherein the actuating means for both of said valve means comprises parallel connected fluid responsive means connected between the first inlet and the first outlet manifolds, and shaft means connected between said fluid responsive means and both of said valve means and movable by said fluid responsive means to reciprocate said valve means.

15. A variable area heat exchanger comprising a first vertically disposed tubular inlet manifold and a first vertically disposed tubular outlet manifold interconnected by a set of horizontal pipes spaced vertically of each other and longitudinally of said manifolds and arranged to transmit therethrough a fluid or liquid the temperature of which is to be controlled, a second vertically disposed tubular inlet manifold and a second vertically disposed tubular outlet manifold interconnected by a set of horizontal pipes spaced vertically of each other and longitudinally of said second manifolds and arranged to transmit therethrough a temperature controlling fluid or liquid, the pipes of one of said sets being disposed within and extending through the pipes of the other of said sets in spaced relationship thereto, tubular valve means rotatably disposed in said first outlet manifold and extending longitudinally thereof and having a plurality of vertically spaced different length ports arranged to register with the pipes connected to said first outlet manifold, tubular valve means rotatably disposed in the second inlet manifold and extending longitudinally thereof and having a plurality of vertically spaced different length ports arranged to register with the pipes connected to said second inlet manifold, means interconnected between the first inlet and the first outlet manifolds and responsive to a change in pressure of the fluid or liquid, a shaft connected to said pressure responsive means, a rack, pinion means operatively connected to said shaft and both of said valve means and movable by said pressure responsive means to locate in phase both of said valve means and bring one or more of said ports into selective registry with one or more of the respective pipes, and valve means operatively connected to the second inlet manifold and operated by said pressure responsive means to connect and/or disconnect the temperature controlling fluid or liquid to or from such second inlet manifold.

16. A variable area heat exchanger as defined in claim 15 and wherein a shaft is interconnected between the fluid responsive means and each of said valve means and is arranged to be moved by said fluid responsive means to reciprocate said valve means, a valve is operatively connected to the shaft attached to said valve means in the second inlet manifold and a valve seat is formed in such second inlet manifold arranged to cooperate with such last named valve to connect and/or disconnect the temperature controlling fluid or liquid to or from said inlet manifold.

17. A variable area heat exchanger comprising a first tubular inlet manifold and a first outlet tubular manifold spaced from and parallel to each other and interconnected by a plurality of separate pipes spaced longitudinally of said manifolds and extending transversely thereof and arranged to transmit therethrough a fluid or liquid the temperature of which is to be controlled, a second inlet tubular manifold and a second outlet tubular manifold spaced apart in parallel relationship and interconnected by a plurality of separate pipes spaced longitudinally of said second inlet and outlet manifolds and extending transversely thereof and arranged to transmit therethrough a temperature controlling fluid or liquid, the individual pipes of one of said plurality of pipes being disposed within and extending through the corresponding individual pipes of the other of said plurality of pipes in spaced relation thereto, tubular valve means movably disposed in and extending longitudinally of at least one of the manifolds for the fluid or liquid the temperature of which is to be controlled, tubular valve means movably disposed in and extending longitudinally of at least one of the manifolds for the temperature controlling fluid or liquid, both of said tubular valve means being provided with a series of different length ports spaced longitudinally of both of said tubular valve means and one or more of said ports being adapted upon movement of said tubular valve means to be brought into registry with one or more of the individual pipes connected to the respective manifolds containing said tubular valve means, and means for actuating both of said valve means simultaneously and in phase and connected between the first inlet manifold and the first outlet manifold and responsive to a change in the fluid or liquid the temperature of which is to be controlled.

18. A variable area heat exchanger as defined in claim 17 wherein all of said manifolds and said valve means are vertically disposed while all of said pipes are horizontally disposed.

19. A variable area heat exchanger as defined in claim 17 and wherein said valve actuating means includes pressure responsive mechanism and operative connections between said mechanism and both of said tubular valve means.

20. A variable area heat exchanger as defined in claim 19 and wherein said tubular movable valve means are rotatable in their respective manifolds.

21. A variable area heat exchanger as defined in claim 19 and wherein said pressure responsive mechanism is a single pressure responsive device.

22. A variable area heat exchanger as defined in claim 19 and wherein said pressure responsive mechanism includes a pair of separate pressure responsive devices connected in parallel between the first inlet and the first outlet manifolds while said operative connections connect one of said devices to one of said tubular valve means and the other of said devices to the other of said tubular valve means.

23. A variable area heat exchanger as defined in claim 19 and wherein one of said tubular valve means is disposed in said first outlet manifold and the other of said tubular valve means is disposed in said second inlet manifold.

24. A variable area heat exchanger as defined in claim 19 and wherein both of said tubular valve means are reciprocable in their respective manifolds.

25. A variable area heat exchanger comprising two sets of manifold chambers with each set having an inlet manifold chamber and an outlet manifold chamber arranged in fixed spaced relationship to each other and to the manifold chambers of the other set and located exteriorly of the latter, a separate group of spaced multiple pipes interconnecting the manifold chambers of each set and communicating with said chambers at spaced apart locations along the walls thereof, each pipe of one group of pipes passing through a different pipe of the other group in spaced relation thereto and forming therewith a predetermined area heat exchanging sub-unit of the entire variable area heat exchanger, one set of manifold chambers receiving fluid or liquid the temperature of which is to be controlled and the chambers of the other set receiving temperature controlling fluid or liquid, a movable sleeve valve interfitting at least one of said manifold chambers and communicating therewith and provided with spaced apart ports sequentially registering with the pipes connected to said one chamber upon movement of said valve from a predetermined closed or off position, said ports being dimensioned with progressively increasing areas such that the first and each succeeding port sequentially registered with their respective pipes remain so registered until all of the said ports are registered, and valve controlling and actuating means operatively connected with said valve including a device responsive to flow changes in the temperature controlled fluid or liquid to move said valve from and to said closed or off position to sequentially register said ports with their respectively pipes or disconnect the same therefrom to sequentially bring into or cut out of operation said heat exchanging sub-units and thus vary the heat exchange area of the entire variable area heat exchanger from minimum to maximum and vice-versa.

26. A variable area heat exchanger as defined in claim 25 wherein said valve is rotatable and said ports therein progressively increase in length in a direction circumferentially of said valve.

27. A variable area heat exchanger as defined in claim 25 wherein said valve is reciprocable and said ports therein progressively increase in length in a direction longitudinally of said valve.

28. A variable area heat exchanger as defined in claim 25 wherein the pipes connected to said one manifold chamber are of different lengths and the first port in said valve that is registered with its pipe when said valve is moved from closed or off position is registered with the shortest of said pipes.

29. A variable area heat exchanger as defined in claim 28 wherein the pipes connected to said one manifold chamber progressively increase in length in the same order that said ports are sequentially registered therewith upon movement of said valve from closed or off position.

References Cited in the file of this patent
UNITED STATES PATENTS

| | | |
|---|---|---|
| 839,561 | Davis | Dec. 25, 1906 |
| 1,018,711 | Kibby | Feb. 27, 1912 |
| 1,830,719 | Rollins | Nov. 3, 1931 |
| 1,851,765 | Henshall | Mar. 29, 1932 |
| 2,085,937 | Zellhoefer | July 6, 1937 |